United States Patent [19]

Ker et al.

[11] 3,914,182
[45] Oct. 21, 1975

[54] HYDRAULIC FLUIDS

[75] Inventors: Robert Alan Cameron Ker; Colin John Harrington, both of London, England

[73] Assignee: Burmah Oil Trading Limited, London, England

[22] Filed: Dec. 14, 1973

[21] Appl. No.: 424,712

Related U.S. Application Data

[63] Continuation of Ser. No. 219,504, Jan. 20, 1970, abandoned.

[30] Foreign Application Priority Data

Jan. 21, 1971 United Kingdom................. 2873/71
July 21, 1971 United Kingdom............... 34240/71

[52] U.S. Cl. ..................... 252/78; 252/49.6; 252/79
[51] Int. Cl.².......................................... C09K 50/00
[58] Field of Search ........... 252/73, 75, 78, 79, 49.6

[56] References Cited
UNITED STATES PATENTS

| | | | |
|---|---|---|---|
| 3,003,968 | 10/1961 | Bruce................................... | 252/79 |
| 3,623,987 | 11/1971 | Ker et al.............................. | 252/79 |
| 3,625,899 | 12/1971 | Sawyer et al. ........................ | 252/78 |
| 3,635,825 | 1/1972 | Sawyer et al. ........................ | 252/78 |
| 3,637,794 | 1/1972 | Sawyer et al. ........................ | 252/78 |

FOREIGN PATENTS OR APPLICATIONS

1,249,803   10/1971   United Kingdom

*Primary Examiner*—Benjamin R. Padgett
*Assistant Examiner*—Deborah L. Kyle
*Attorney, Agent, or Firm*—Bacon & Thomas

[57] ABSTRACT

A hydraulic fluid comprises from 10 to 99% by weight of an ester or mixture of esters, having the general formula:

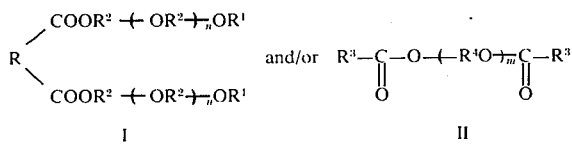

wherein R is a straight or branched chain alkylene group containing at least 2 carbon atoms, each $R^1$ is the same or different and is an alkyl radical containing from 1 to 4 carbon atoms or a phenyl radical, each $R^2$ is the same or different and is an ethylene, propylene or butylene group, each n is the same or different and is 0 or an integer of from 1 to 3, each $R^3$ is the same or different and is an ethyl or methyl group, each $R^4$ is the same or different and is an ethylene or propylene group and m is an integer and from 1 to 90% by weight of a borate ester, or mixture of borate esters, having one of five specified general formulae, for example:

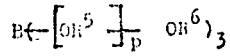

wherein each $R^5$ is the same or different and is a straight or branched chain alkyl group, each $R^6$ is the same or different and is an alkyl group and each p is the same or different and is an integer.

HYDRAULIC FLUIDS

This is a continuation of application Ser. No. 219,504, filed Jan. 20, 1970, now abandoned.

This invention relates to hydraulic fluids for use in fluid pressure operating devices such as hydraulic brake systems, hydraulic steering mechanisms and hydraulic transmissions.

According to the present invention there is provided a hydraulic fluid comprising from 10% to 99% by weight of an ester, or mixture of esters, having the general formula:

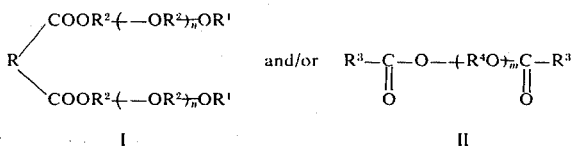

wherein R is a straight or branched chain alkylene group containing at least 2, preferably 2 to 8, carbon atoms, each $R^1$ is the same or different and is an alkyl redical containing from 1 to 4 carbon atoms or a phenyl radical, each $R^2$ is the same or different and is an ethylene, propylene or butylene group, each $n$ is the same or different and is 0 or an integer of from 1 to 3, each $R^3$ is the same or different and is an ethyl or methyl group, each $R^4$ is the same or different and is an ethylene or propylene group and $m$ is an integer, preferably an integer such that the total number of carbon atoms in the $-R^4O-_m$ group is from 4 to 12, more preferably 4 to 9 and from 1 to 90% by weight of a borate ester, or mixture of borate esters, having one of the following general formulae:

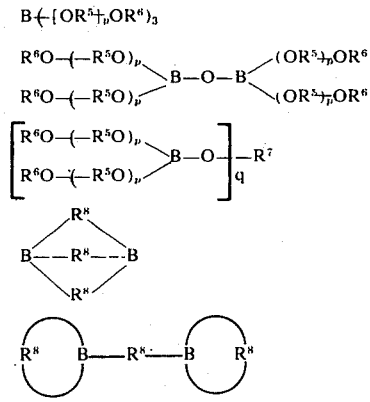

wherein each $R^5$ is the same or different and is a straight or branched chain alkyl group, each $R^6$ is the same or different and is an alkyl group, each p is the same or different and is an integer, q is an integer of from 2 to 6, $R^7$ is the residue of a di-or poly-hydroxy organic compound having a number of reactive hydroxy groups equal to q, and each $R^8$ is the same or different and is the residue of a di-hydroxy organic compound which residue is attached to each boron atom via an oxygen atom.

It is highly desirable that the hydraulic fluids of the present invention have a kinematic viscosity at −40°C of not more than 5,000 cSt, especially not more than 2,000 cSt. It is also desirable that the hydraulic fluids have a boiling point of at least 260°C.

The dicarboxylic acid esters of formula I are described in U.K. Pat. Specification No. 1,083,424. Esters which may suitably be used in the present invention are the succinates, glutarates, adipates, azelates, sebacates, isosebacates and nylonates of methyl, ethyl propyl and butyl oxitol, dioxitol and trioxitol described in U.K. Specification No. 1,083,324, the nylonates, especially di(methyl dioxitol) nylonates, being particularly preferred.

The glycol di-esters of formula II are known compounds and the preferred glycol di-esters are the glycol dipropionates described in U.K. Pat. Specification No. 1249803. It is preferred that the hydraulic fluids comprise not more than 50% by weight of the glycol di-esters; the remainder, if any, of the carboxylic acid ester component being the esters of formula I.

Preferred borate esters for use in the present invention are those in accordance with foregoing formula III in which each $R^5$ contains from 1 to 4 carbon atoms and each $R^6$ contains 1 to 8, more preferably 1 to 4 carbon atoms. Preferably each integer p is from 1 to 8, more preferably 1 to 4. It is particularly preferred that the total of the three integers p is from 5 to 15. Specific examples of such borate esters are:

Tris methyl triethylene glycol borate
Tris ethyl triethylene glycol borate
Tris methyl diethylene glycol borate
Tris ethyl diethylene glycol borate
Methyl diethylene glycol ethyl diethylene glycol methyl triethylene glycol borate
Butyl diethylene glycol or bis butyl diethylene glycol borates in which the, or each, group $+OR^5+OR^6$ not derived from the monobutyl ether of diethylene glycol is derived from the monomethyl or monoethyl ether of di- or tri-ethylene glycol
Alkyl glycol or bis alkyl glycol borates in which the, or each, group $+OR^5+_pOR^5$ not derived from a monoalkyl ether of a monoglycol is derived from the monomethyl or monoethyl ether of di- or tri-ethylene glycol.

The preferred form of $R^5$, $R^6$ and p in borate esters according to formulae IV and V is the same as the preferred $R^5$, $R^6$ and p for borate esters according to formula III. The group $R^7$ can be derived from a glycol or thioglycol, an alkanolamine or alkoxylated alkanolamine or a polyol having from 3 to 6 hydroxy groups. Examples of polyols which may be used include pentaerythritol and sorbitol. Examples of suitable alkanolamines have the formula:

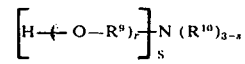

wherein each $R^9$ is the same or different and is an alkylene group, preferably containing 2 to 4 carbon atoms, r is an integer of from 1 to 10, s is 2 or 3 and $R^{10}$ is a hydrogen atom or an alkyl group, preferably containing 1 to 4 carbon atoms. Thioglycols from which $R^7$ can be derived may be of the formula $HO+R''X+_t R''-OH$ wherein $t$ is an integer, preferably from 1 to 10, each X is the same or different and is an oxygen or sulphur atom, at least one X being a sulphur atom, and each $R''$ is the same or different and is an alkylene group containing from 2 to 4 carbon atoms.

However, it is particularly preferred that $R^7$ is derived from a glycol, q in this case being 2. In this case R⁷ has the formula $+O-R^{12}+O_u$ wherein $u$ is an integer and $R^{12}$ is a $C_{2-12}$ alkylene group. When R⁷ is derived from a simple glycol, e.g. ethylene glycol or hexamethylene glycol, $u$ will be 1 and in this case $R^{12}$ is preferably a $C_{2-8}$ alkylene group. Alternatively R⁷ may be derived from a polyoxyalkylene glycol. In this case $u$ will be an integer greater than 1. Preferably $u$ is an integer of from 2 to 4 and $R^{12}$ is an alkylene group containing from 2 to 4 carbon atoms.

In the foregoing formulae VI and VII, the group $R^8$ is derived from a di-hydroxy compound, which is preferably a glycol. In this case $R^8$ is more preferably a glycol residue of the formula $-O-R^{13}-O)_v$ wherein each $R^{13}$ is the same or different and is an alkylene group and $v$ is an integer of from 1 to 8. When $v$ is 1, $R^{13}$ may be a $C_{2-8}$ alkylene group and $R^8$ will be derived from, for example, ethylene glycool, propylene glycol or hexamethylene glycol. However, most preferably, $R^8$ is derived from a polyoxyalkylene glycol and $v$ is an integer of from 2 to 4. In this embodiment $R^{13}$ is most preferably a $C_{2-4}$ alkylene group.

The borate esters used in the hydraulic fluids of the present invention are also known compounds, for example, as described in U.S. Pat. Specification No. 3080412 and U.K. Pat. Specifications Nos. 1232369 and 1232370. Borate esters according to formula III can be prepared by esterifying orthoboric acid with monoethers of oxylalkylene or polyoxyalkylene glycols. The esterification may be carried out by conventional esterification techniques and esterification can be with three moles of glycol monoether per mole orthoboric acid; with one or two moles of glycol monoether followed by esterification with two or one moles respectively of a different glycol monoether or by a three-stage process with one mole of each of three different glycol monoethers. The esterification is preferably carried out in a slight excess, e.g. 10% excess, of the glycol monoether (i.e. in excess of the particular molar proportion). For example, in a simple one-stage esterification of 1 mole of orthoboric acid it is preferred to employ 3.3 moles of the glycol monoether.

Borate esters according to formula IV may be prepared in similar manner by esterification of boric acid with one or more glycol monoethers in the appropriate amounts. The esterification may be carried out using conventional techniques. Similarly borate esters of formula V may be prepared by conventional esterification techniques. Thus boric acid, preferably orthoboric acid, is esterified with twice the molar quantity of one or more glycol monoethers to yield an intermediate of formula:

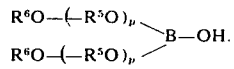

The intermediate is then reacted with the appropriate di- or poly-hydroxy organic compound, from which the group R⁷ is derived.

The borate esters of formula VI and VII may also be prepared by conventional esterification techniques, using the appropriate molar ratios of boric acid and di-hydroxy compounds.

After preparation of the borate esters, separation and purification may be carried out in known manner.

The proportion of the borate ester employed in the hydraulic fluids of the present invention may be from 2 to 80%, preferably from 2 to 60% by weight and within this preferred range a wide variety of proportions may be selected, with corresponding adjustment of the dicarboxylic acid ester content. For example, a proportion of from 5 to 20%, e.g. 10%, by weight of borate ester may be used. Alternatively, a proportion of from 40 to 60%, e.g. 45 or 55%, by weight of borate ester may be used.

It will be understood that in addition to the borate and dicarboxylic acid esters of formulae I to VII, the hydraulic fluids of the present invention may contain small amounts of additives conventionally employed in hydraulic fluids.

Typical additives which may be used in the invention are lubricity additives selected from castor oil or castor oil treated in various ways, for example, Firsts Castor Oil, Castor oil to Specification DTD72

Blown castor oil, i.e. castor oil blown with air or oxygen while being heated.

Special Pale Blown Castor Oil, i.e. a similarly blown castor oil.

"Hydricin 4" i.e. a commercially available ethylene/oxide/propylene oxide treated castor oil.

Other lubricity additives which may be incorporated in hydraulic fluids in accordance with the present invention include borate esters e.g. tricresyl borate and phosphorus-containing esters, especially phosphates e.g. tricresyl phosphate.

The hydraulic fluids of the present invention may also include minor proportions of polyoxyalkylene glycols or ethers thereof e.g. those sold by Union Carbide Corporation under the Registered Trade Mark "Ucon," particularly those of the LB AND HB series. Suitable examples of these polyoxyalkylene glycols and their ethers and esters are given in British Pat. Specification No. 1,055,641. Other suitable lubricity agents are orthophosphate or sulphate salts of primary or secondary aliphatic amines having a total of from 4 to 24 carbon atoms, dialkyl citrates having an average of from 3½ to 13 carbon atoms in the alkyl groups, aliphatic dicarboxylic acids and esters thereof, specific examples being Diamylamine orthophosphate Dinonylamine orthophosphate Diamylamine sulphate Dinonyl citrate Di(2-ethyl hexyl)citrate Polyoxyethylene sebacate derived from a polyoxyethylene glycol of M.W.200

Polyoxyethylene azelate derived from a polyoxyethylene glycol of M.W.200

Polyoxyethylene adipate derived from a polyoxyethylene glycol of M.W.200

Polyoxyethylene/polyoxypropylene glutarate derived from mixed polyoxyglycols of average M.W. of about 200

Glutaric acid

Azelaic acid

Sebacic acid

Succinic acid

Di ethyl sebacate

Di 2-ethyl hexyl sebacate

Di iso octyl azelate

Unsaturated aliphatic acids or their salts may also be used e.g. oleic acid or potassium ricinoleate.

Corrosion inhibitors which may be used in the present invention may be selected from heterocyclic nitrogen containing compounds, e.g. benzotriazole and benzotriazole derivatives such as those described in British Pat. Specification No. 1,061,904 or mercapto benzothiazole. Many amines or derivatives thereof are also suitable as corrosion inhibiters, for example di n-butylamine
di n-amylamine
cyclohexylamine
morpholine
triethanolamine and soluble salts thereof e.g. cyclohexylamine carbonate.

Phosphites are also good corrosion inhibitors e.g.
Tri phenyl phosphite
Di isopropyl phosphite and certain inorganic salts may be incorporated e.g. sodium nitrate.

Other additives which may be included are antioxidants such as diarylamines e.g. diphenylamine, p,p'-dioctyl-diphenylamine, phenyl-$\alpha$-naphthylamine or phenyl-$\beta$-naphthylamine. Other suitable antioxidants are those commonly known as hindered phenols which are exemplified by 2,4-dimethyl-6-t-butyl phenol
2,6-di-t-butyl-4-methyl phenol
2,6-di-t-butyl phenol
1,1-bis (3,5-di-t-butyl-4-hydroxyphenyl)-methane
3,3',5,5'-tetra-t-butyl - 4 - 4' - dihydroxy-diphenyl
3-methyl-4,6-di-t-butyl phenol
4-methyl-2-t-butyl phenol Yet further additives which may be used are phenothiazine and its derivatives, for example those having alkyl, or aryl, groups attached to the nitrogen atom or to the aryl groups of the molecule.

Other additives which may be used include alkylene oxide/ammonia condensation products as corrosion inhibitor, for example the propylene oxide/ammonia condensation product described in U.K. Pat. Specification No. 1249803. Further lubricity additives which may be used are complex esters, such as that sold under the trade name Reoplex 641 and also described in U.K. Specification No. 1249803. Moreover, long chain (e.g. $C_{10-18}$) primary amine corrosion inhibitors and polymerised quinoline resin antioxidants, as described in Specification No. 1249803, may be used, examples of such amines and resins being the commercially available materials Armeen 12D and Agerite resin D respectively.

Conventional additives such as those hereinbefore described are normally employed in small amounts such as 0.5 to 10% for example, 0.1 to 2% by weight.

As hereinbefore stated the fluids of the present invention may contain conventional hydraulic fluid additives, including corrosion inhibitors such as amines and derivatives thereof. We have now found that certain amines are also useful in the hydraulic fluids for a different purpose. In particular these amines suppress a tendency for the borate esters in the hydraulic fluid to precipitate boric acid in service, the boric acid being derived from hydrolysis in the presence of absorbed atmospheric moisture.

The amines which are particularly useful for stabilising the hydraulic fluids, i.e. suppressing boric acid precipitation, are aliphatic amines and certain aromatic amines. Accordingly, in a preferred aspect of the invention the fluids contain an aliphatic amine, more preferably a primary or secondary aliphatic amine. It is especially preferred to use a primary or secondary aliphatic amine containing from 4 to 12 carbon atoms, e.g. n-butylamine, n-laurylamine or n-octylamine. As hereinbefore stated certain aromatic amines may be used, in a non-preferred embodiment, in place of the aliphatic amines. Examples of the aromatic amines include diphenylamine, phenyl hydrazine, p-phenylene diamine and o-,m- or p-aminophenol.

The amine stabilisers may be used in an amount of from 0.1 to 5%, preferably from 0.5 to 3%, by weight based on the total weight of the hydraulic fluid.

It will be understood that mixtures of the borate esters hereinbefore described may be employed in the present invention. Moreover "mixed" esters may be used, i.e. esters derived from 2 or more different glycol monoethers. Such "mixed" esters will contain 2 or more different glycol monoether residues in each molecule and it may be that ester interchange may take place to a greater or lesser degree, i.e. transference of glycol monoether residues from one boron atom to another may occur so that different borate esters are formed in service. The resulting mixture of borate esters will, of course, be indistinguishable from mixtures formed by blending of the separate esters in the appropriate amounts, hence the use of such mixtures in hydraulic fluids is included in the present invention.

In another aspect of the present invention there is provided a hydraulic system containing the hydraulic fluids of the present invention. In a further aspect there is provided a method of transmitting lower, which method comprises introducing the hydraulic fluids of the present invention into a hydraulic system and transmitting power by applying pressure thereto.

The invention will now be illustrated with reference to the following examples.

EXAMPLE 1

Methyl diethylene glycol ethyl diethylene glycol methyl triethylene glycol borate was prepared by refluxing 2 moles of orthoboric acid with 2.2 mole of triethylene glycol monomethyl ether for 3 hours in a Dean and Stark apparatus in the presence of 200 ml. toluene as a water entrainer. After the evolution of 35 ml. of water, 2.2 mole of diethylene glycol monoethyl ether was added and refluxing continued for 5 hours until a further 36 ml. of water was evolved. Thereafter 2.2 mole of diethylene glycol monomethyl ether was added and refluxing continued for 6 hours until 36 ml. of water was evolved. After completion of the esterification, toluene and excess glkycol ether were stripped off (7½/mm/Hg. 100°C.) to produce the methyl diethylene glycol ethyl diethylene glycol methyl triethylene glycol borate (Yield 774g. 91%) which has a SAE equilibrium reflux Boiling Point of 327°C. and a viscosity of 889 cSt. at −40°C.

Humidity tests were carried out on blends of this borate ester with dicarboxylic acid esters by placing 70 mls. of the fluid being tested in a 250 ml. beaker and leaving for 6 hours in an environmental cabinet at 80% Relative Humidity and 95°F. The boiling point of the fluid was determined before and after treatment in this manner, the drop in boiling point indicating the effect of humidity on the test fluids.

The fluids tested and the results obtained were as follow:

| Fluid | | Initial B.Pt.(°C) | Final B.Pt.(°C) |
|---|---|---|---|
| 100% | borate ester | 327 | 149 |
| 50% | borate ester | | |
| 50% | DMDGN | 329 | 156 |
| 45% | borate ester | | |
| 45% | DMDGN | 306 | 145 |
| 10% | monoethyl ether of triethylene glycol. | | |

DMDGN was the di-(monoethyl ether of diethylene glycol) nylonate described in U.K. Pat. Specification No. 1,083,324.

Further examples of fluids in accordance with the present invention were formulated as in the following examples 2 to 22, in which all parts are by weight:

EXAMPLE 2

| DMDGN | 48 | parts |
|---|---|---|
| TEGDP | 42 | parts |
| Borate A | 10 | parts |
| Di-amylamine | 0.5 | parts |

TEGDP was the dipropionate of triethylene glycol and Borate A was tris (monomethyl ether of triethylene glycol) borate.

EXAMPLE 3

| DMDGN | 15 | parts |
|---|---|---|
| TEGDP | 35 | parts |
| Borate A | 50 | parts |
| Di-n-hexylamine | 1.0 | parts |

EXAMPLE 4

| DMDGN | 32 | parts |
|---|---|---|
| TEGDP | 38 | parts |
| Borate A | 30 | parts |
| n-Octylamine | 0.7 | parts |

EXAMPLE 5

| DMDGN | 52 | parts |
|---|---|---|
| TEGDP | 37 | parts |
| Borate B | 10 | parts |
| Di-n-hexylamine | 1.0 | parts |
| Agerite Resin D | 0.3 | parts |

Borate B was tris (monomethyl ether of diethylene glycol) borate.

EXAMPLE 6

| DMGN | 52 | parts |
|---|---|---|
| TEGDP | 17 | parts |
| Borate B | 30 | parts |
| Octylamine | 1.0 | parts |
| Agerite Resin D | 0.5 | parts |

EXAMPLE 7

| DMDGN | 49 | parts |
|---|---|---|
| Borate B | 49 | parts |
| Octylamine | 2 | parts |
| Agerite Resin D | 0.5 | parts |

EXAMPLE 8

| TEGDA | 48 | parts |
|---|---|---|
| Borate B | 49 | parts |
| Primene 81-R | 3 | parts |
| Benzotriazole | 0.1 | parts |

TEGDA was the diacetate of triethylene glycol and Primene 81-R was a commercially available mixture of tertiary alkyl primary amines containing from 12 to 14 carbon atoms.

EXAMPLE 9

| TEGDP | 50 | parts |
|---|---|---|
| Borate A | 50 | parts |
| Armeen 10D | 1.0 | parts |

Armeen 10D was a commercially available distilled grade of primary amine consisting of about 90% n-decylamine, 4% n-octylamine and 6% n-dodecylamine.

EXAMPLE 10

| Borate A | 63.5 | parts |
|---|---|---|
| TEGDP | 35.0 | parts |
| Armeen 10D | 1.5 | parts |
| Benzotriazole | 0.1 | parts |

EXAMPLE 11

| Borate C | 45 | parts |
|---|---|---|
| DMDGN | 40 | parts |
| TEGDP | 15 | parts |
| Octylamine | 0.7 | parts |

Borate C was ethyl diethylene glycol methyl diethylene glycol methyl triethylene glycol borate.

EXAMPLE 12

| Borate D | 30 | parts |
|---|---|---|
| DMDGN | 30 | parts |
| TEGDP | 35 | parts |
| Primene 81-R | 1.0 | parts |

Borate D was bis methyl triethylene glycol methyl diethylene glycol borate.

EXAMPLE 13

| Borate E | 20 | parts |
|---|---|---|
| DMDGN | 45 | parts |
| TEGDP | 35 | parts |
| Di-hexylamine | 1.0 | parts |

Borate E was tris (monoethyl ether of triethylene glycol) borate.

EXAMPLE 14

| | | |
|---|---|---|
| Borate F | 15 | parts |
| DMDGN | 60 | parts |
| TEGDP | 25 | parts |
| Di-amylamine | 1.0 | parts |

Borate F was tris (1-butoxy ethoxy - 2 - propanol) borate.

EXAMPLE 15

| | | |
|---|---|---|
| Borate G | 20 | parts |
| DMDGN | 70 | parts |
| TEGDP | 10 | parts |
| Di-amylamine | 1.0 | parts |

Borate G was tris (monobutyl ether of diethylene glycol) borate.

EXAMPLE 16

| | | |
|---|---|---|
| Borate H | 25 | parts |
| DMDGN | 40 | parts |
| TEGDP | 35 | parts |
| Octylamine | 0.7 | parts |

Borate H was bis ethyl triethylene glycol isopropyl triethylene glycol borate.

EXAMPLE 17

| | | |
|---|---|---|
| Di-(monomethyl ether of diethylene glycol) adipate | 60 | parts |
| Borate A | 30 | parts |
| TEGDP | 10 | parts |
| Armeen 12 D | 0.5 | parts |

Armeen 12 D was a commercially available distilled grade of primary amine consisting of about 95% n-dodecylamine, 2% n-decylamine and 3% n-tetradecylamine.

EXAMPLE 18

| | | |
|---|---|---|
| Di-(monoethyl ether of triethylene glycol) succinate | 30 | parts |
| Borate A | 40 | parts |
| TEGDP | 30 | parts |
| Di-amylamine | 1.0 | parts |

EXAMPLE 19

| | | |
|---|---|---|
| Di-(monomethyl ether of propylene glycol) succinate | 30 | parts |
| DMDGN | 20 | parts |
| TEGDP | 20 | parts |
| Borate A | 30 | parts |
| Di-hexylamine | 1.0 | parts |

EXAMPLE 20

| | | |
|---|---|---|
| Di-(mono-i-propyl ether of diethylene glycol) adipate | 30 | parts |
| Borate A | 40 | parts |
| DMDGN | 15 | parts |
| TEGDP | 15 | parts |
| Octylamine | 1.0 | parts |

EXAMPLE 21

| | | |
|---|---|---|
| Di(monomethyl ether of diethylene glycol) azelate | 60 | parts |
| Borate A | 30 | parts |
| TEGDP | 10 | parts |
| Armeen 10D | 1.5 | parts |

EXAMPLE 22

| | | |
|---|---|---|
| Di-(monoethyl ether of triethylene glycol) sebacate | 20 | parts |
| DMDGN | 20 | parts |
| Borate A | 30 | parts |
| TEGDP | 30 | parts |
| Primene 81-R | 2.0 | parts |

In order to illustrate the properties of the hydraulic fluids of the present invention the foregoing blends 2 to 22 were tested using a variety of standard testing procedures. The results of these tests showed that the blends were useful hydraulic fluids, particularly for use in hydraulic brake and clutch systems. For example, blends 2, 3 and 4 using the same ester components in varying proportions all fully satisfy the requirements of the SAE J1703 b specification for high quality heavy duty hydraulic fluids, and also satisfy the stringent corrosion requirements of the Ford ESA-M6C-1001-A specification. Other blends also fully satisfied the SAE J1703 b specification, or the slightly revised SAE J 1703 c specification introduced during the period when the blends were being tested. For example blend 10, in which the carboxylate ester component consisted entirely of esters in accordance with Formula II, fully satisfies the requirements of the SAE J1703 c specification.

The test also revealed that the properties of the blends were not a simple compromise between the desirable high temperature properties of the borate ester component and the desirable low temperature properties of the carboxylate ester component. On the contrary the tested blends showed that both low and high temperature properties were retained to an unexpectedly large extent, in some case there being substantial complete retention of desirable properties at both high and low temperatures. In particular the blends in accordance with the present invention had good boiling points, vapour lock temperatures and low temperature viscosity properties. Furthermore, these properties do not deteriorate unduly even in the presence of substantial quantities of water. During the service life of a hydraulic brake fluid moisture is absorbed from the atmosphere and this impairs the properties of the fluid. If the properties are impaired to too great an extent the operating efficiency of the hydraulic system containing the fluid is seriously reduced. It is therefore extremely important that the properties of a hydraulic brake fluid do not deteriorate unduly in the presence of water.

The low temperature viscosity properties of the fluids of the present invention were tested by determining the viscosity at −40°C in accordance with the procedure set forth in the SAE J1703 specification, the viscosity being determined for dry samples of the tested fluids and also for samples to which known quantities of water had been added. The results are set out in the following Table 1.

The boiling point of the tested fluids were determined by the procedure set out in the SAE J1703 specification, the boiling point being determined for dry samples of the tested fluids and also for duplicate samples of the fluid after being subjected to a D.O.T. Humidity test according to the procedure set forth in the F M V S S 116 specification. Briefly, the humidity test is carried out by enclosing one sample of the test fluid in each of two dessicators and one sample of a standard reference fluid in each of a further two dessicators, there being an aqueous slurry of ammonium sulphate in each dessicator which provides an atmosphere of 80% Relative Humidity. The samples are kept in the dessicator until the reference fluid absorbs 3.5% by weight of water. The results obtained are set out in the following Table 2.

The vapour lock temperatures of the tested fluids were determined using an apparatus comprising a substantially spherical glass bulb having a hollow, volumetrically calibrated, cylindrical projection extending vertically from the top of the bulb, the projection being sealed at its upper end. A glass tube extends laterally from the bottom of the bulb and further extends vertically alongside the bulb, before terminating in a funnel. The bulb is completely filled with the test fluid via the funnel and glass tube so that no air bubbles remain in the bulb. The bulb is then completely submerged in a heating bath filled with a transport fluid through which the calibrated section of the apparatus can be viewed and the temperature of the bath is gradually increased. When any vapour formation occurs, this vapour accumulates in the calibrated section of the apparatus and the temperature at which pre-selected quantities of vapor accumulate can be determined. The following Table 3 sets out the results obtained in this test for dry samples of test fluid and also for a wet sample of test fluid formed by mixing the duplicate samples of the test fluid which had been used in the boiling point determinations after the D.O.T. Humidity tests.

The Rubber Swell properties of the test fluids were also determined according to the procedure set forth in the SAE J1703 specification. The results obtained are set out in the following Table 4.

The results set out in Table 1 show that the fluids in accordance with the present invention are of the same high standard of quality with respect to low temperature viscosity properties in the presence of water as the known hydraulic fluids based on the carboxylate esters in accordance with foregoing formulae I and II without the addition of the borate esters. Conversely, hydraulic fluids based on the borate esters, without carboxylate esters present, are known to have relatively poor low temperature viscosity properties in the presence of water.

In a similar manner the results set out in Tables 2 and 3 show that the high temperature properties of the fluids of the present invention are comparable with the high temperature properties of fluids based on borate esters, without carboxylate esters present, whereas fluids based on carboxylate esters without borate esters are known to have relatively poor high temperature properties.

The rubber swell test results set out in Table 4 show the fluids of the present invention may be blended so as to comply with the commonly accepted standards required by such specifications as the SAE J1703 specification.

TABLE 1

| Test Blend | Low Temperature Viscosity Properties Viscosity at −40°C(cSt) | | | | |
|---|---|---|---|---|---|
| | Dry | 1% water | 2% water | 3% water | 5% water |
| Example 2 | 1763 | 1727 | — | 1777 | 1837 |
| Example 3 | 1737 | 1735 | — | 1994 | 2255 |
| Example 4 | 1766 | 1727 | — | 1929 | 2032 |
| Example 5 | 1657 | 1559 | — | 1769 | 1724 |
| Example 6 | 1522 | 1613 | — | 1824 | 2020 |
| Example 7 | 1427 | 1487 | — | 1775 | 2019 |
| Example 8 | 1252 | 1206 | — | 1342 | 1557 |
| Example 9 | 1208 | 1267 | — | 1498 | 1681 |
| Example 10 | 1370 | 1470 | — | 1710 | 1760 |
| Example 11 | 1501 | 1633 | 1808 | 1990 | 2277 |
| Example 12 | 1686 | 1708 | 1783 | 1899 | 2058 |
| Example 13 | 1831 | 1886 | 1843 | 1964 | 2124 |
| Example 14 | 1980 | — | — | — | 2374 |
| Example 15 | 2290 | 2173 | 2638 | 3004 | — |
| Example 16 | 1882 | 1912 | 1961 | 2069 | 2220 |
| Example 17 | 1874 | 2031 | — | 2266 | 2474 |
| Example 18 | 3233 | 3264 | — | 3582 | 4004 |
| Example 19 | 2084 | 2189 | — | 2514 | 2521 |
| Example 20 | 2059 | 2069 | — | 2338 | — |
| Example 21 | 2358 | 2351 | — | 2541 | 3042 |
| Example 22 | 2439 | 2406 | — | 2599 | 3048 |

TABLE 2

| Best Blend | Boiling Points Before and After D.O.T. Humidity Test Boiling Point (°C) | | | | |
|---|---|---|---|---|---|
| | Dry | Wet (Sample A) | Wet (Sample B) | Mean (A+B) | Water Content (% by wt) |
| Example 2 | 312.5 | 200 | 192 | 196 | 2.19 |
| Example 3 | 309 | 196 | 199 | 197.5 | 3.74 |
| Example 4 | 311 | 182 | 193 | 187.5 | 3.23 |
| Example 5 | 299 | 164 | 173 | 168.5 | 2.86 |
| Example 6 | 299 | 181 | 187 | 184 | 3.60 |
| Example 7 | 310 | 202 | 209 | 205.5 | 4.43 |
| Example 8 | 273.5 | 182 | 191 | 186.5 | 4.52 |
| Example 9 | 307 | 205 | 204 | 204.5 | 3.66 |
| Example 10 | 311 | * | * | 213 | 3.77 |
| Example 11 | 305 | 188 | 205.5 | 197 | 3.94 |
| Example 12 | 302 | 193 | 180 | 186.5 | 3.84 |
| Example 13 | 305 | 192 | 194 | 193 | 3.02 |
| Example 14 | 315 | 197 | 202 | 199.5 | 2.16 |
| Example 15 | 309 | 199 | 200 | 199.5 | 2.60 |
| Example 16 | 307 | 179 | 180 | 179.5 | 2.75 |
| Example 17 | 299 | * | * | 193 | 3.37 |
| Example 18 | 306 | * | * | 204 | 3.35 |
| Example 19 | 294 | * | * | 192.5 | 3.24 |
| Example 20 | 297 | * | * | 190.5 | 3.42 |
| Example 21 | 307 | * | * | 201.5 | 3.22 |
| Example 22 | 302 | * | * | 170 | 3.15 |

*Not recorded.

TABLE 3

Vapour Lock Temperatures Before and After D.O.T. Humidity Test

| Best Blend | Vapour Lock Temperatures (°C)-Dry | | | | Vapour Lock Temperature (°C)-combined duplicate wet samples | | | |
|---|---|---|---|---|---|---|---|---|
| | 0.4 ml vapour | 1.0 ml | 3.0 ml | 5.0 ml | 0.4 ml vapour | 1.0ml | 3.0ml | 5.0ml |
| Example 2 | * | * | * | 299 | 157 | 158 | 160 | 163 |
| Example 3 | * | * | * | 300 | 167 | 171 | 174 | 175 |
| Example 4 | * | * | * | 311 | 154 | 158 | 162 | 165 |
| Example 5 | * | * | * | 280 | 140 | 145 | 150 | 155 |
| Example 6 | * | * | * | 294 | 164 | 165 | 170 | 173 |
| Example 7 | * | * | * | 301 | 180 | 180 | 184 | 186 |
| Example 8 | * | * | * | 273 | 163 | 167 | 171 | 173 |
| Example 9 | * | * | * | 305 | 170 | 173 | 176 | 178 |
| Example 10 | 290 | 292 | 297 | 300 | 178 | 182 | 186 | 188 |
| Example 11 | 276 | 280 | 284 | 286 | 164 | 167 | 173 | 176 |
| Example 12 | 280 | 284 | 288 | 290 | 161 | 164 | 166 | 168 |
| Example 13 | 278 | 282 | 286 | 289 | 145 | 150 | 152 | 154 |
| Example 14 | 278 | 283 | 288 | 291 | 154 | 157 | 160 | 162 |
| Example 15 | 295 | 299 | 302 | 305 | 155 | 158 | 161 | 162 |
| Example 16 | 293 | 296 | 299 | 301 | 147 | 151 | 153.5 | 155 |
| Example 17 | 273 | 278 | 285 | 288 | 152 | 160 | 164 | 165 |
| Example 18 | 286 | 290 | 295 | 297 | 167 | 170 | 173 | 174.5 |
| Example 19 | 272 | 277 | 280 | 281 | 152 | 155 | 159 | 160 |
| Example 20 | 295 | 299 | 302 | 304 | 160 | 162 | 165 | 167 |
| Example 21 | 293 | 297 | 300 | 303 | 154 | 157 | 158 | 161 |
| Example 22 | 288 | 289 | 293 | 296 | 154 | 156 | 159 | 161 |

*Not recorded

TABLE 4

Rubber Swell Properties (Effect on SBR cups)

| BEST BLEND | Effect on SBR cups (120 hours at 70°C) | | Effect on SBR cups (70 hours at 120°C) | |
|---|---|---|---|---|
| | Base diameter increase (mm) | Hardness decrease (points) | Base diameter Increase (mm) | Hardness decrease (points) |
| Example 2 | 0.9 | Nil | 1.27 | 3 |
| Example 3 | 1.08 | 5 | 1.35 | 5 |
| Example 4 | 0.94 | 10 | 1.28 | 8 |
| Example 5 | 0.96 | 10 | 1.30 | 6 |
| Example 6 | 0.86 | 9 | 1.32 | 5 |
| Example 7 | 1.02 | 7 | 1.22 | 4 |
| Example 8 | 1.21 | 5 | 1.69 | 10 |
| Example 9 | 1.10 | 10 | 1.59 | 7 |
| Example 10 | 0.72 | 3 | 1.34 | 8 |
| Example 11 | — | — | 1.34 | 4 |
| Example 12 | — | — | 1.18 | 6 |
| Example 13 | — | — | 1.38 | 7 |
| Example 14 | — | — | 1.80 | 5 |
| Example 15 | — | — | 1.47 | 5 |
| Example 16 | — | — | 1.46 | 5 |
| Example 17 | — | — | 0.89 | 4 |
| Example 18 | — | — | 1.05 | 2 |
| Example 19 | — | — | 1.51 | 7 |
| Example 20 | — | — | 1.45 | — |
| Example 21 | — | — | 1.44 | 13 |
| Example 22 | — | — | 1.40 | 11 |

We claim:

1. A hydraulic fluid consisting essentially of from 10 to 90% by weight of at least one ester having a general formula selected from the group consisting of:

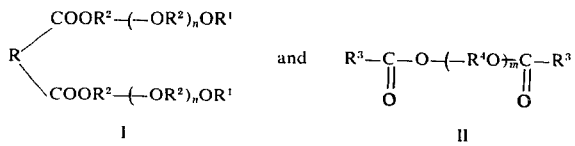

wherein R is selected from the group consisting of straight chain alkylene groups containing 2 to 8 carbon atoms and branched chain alkylene groups containing 2 to 8 carbon atoms, each $R^1$ is the same or different and is selected from the group consisting of alkyl radicals containing from 1 to 4 carbon atoms and a phenyl radical, each $R^2$ is the same or different and is selected from the group consisting of an ethylene group, a propylene group and a butylene group, each $n$ is the same or different and is selected from the group consisting of O and an integer of from 1 to 3, each $R^3$ is the same or different and is selected from the group consisting of an ethyl group and a methyl group, each $R^4$ is the same or different and is selected from the group consisting of an ethylene group and a propylene group and m is an integer such that the total number of carbon atoms in the $(\!-\!R^4O\!-\!)_m$ group is from 4 to 12, and from 10 to 90% by weight of at least one borate ester having the general formula

wherein each $R^5$ is the same or different and is selected from the group consisting of straight chain alkyl groups containing from 1 to 4 carbon atoms and branched chain alkyl groups containing from 1 to 4 carbon atoms, each $R^6$ is the same or different and is an alkyl group containing from 1 to 8 carbon atoms and each $p$ is the same or different and is an integer of from 1 to 8.

2. A hydraulic fluid according to claim 1 wherein each $R^6$ contains from 1 to 4 carbon atoms and each integer $p$ is from 1 to 4.

3. A hydraulic fluid according to claim 1 wherein the total of the three integers $p$ is from 5 to 15.

4. A hydraulic fluid according to claim 1 additionally comprising from 0.1 to 5% by weight of an amine selected from the group consisting of primary aliphatic amines containing from 4 to 12 carbon atoms, secondary aliphatic amines containing from 4 to 12 carbon atoms, diphenylamine, phenyl hydrazine, p-phenylene diamine, o-aminophenol, m-aminophenol and p-aminophenol.

5. A hydraulic fluid as claimed in claim 1 wherein the borate ester is selected from the group consisting of tris methyl triethylene glycol borate; tris ethyl triethylene glycol borate; tris methyl diethylene glycol borate; tris ethyl diethylene glycol borate; methyl diethylene glycol ethyl diethylene glycol methyl triethylene glycol borate; butyl diethylene glycol or bis butyl diethylene glycol borates in which the, or each, group $-OR^5]_pOR^6$ not derived from the monobutyl ether of diethylene glycol is derived from the monomethyl or monoethyl ether of di- or tri-ethylene glycol; and alkyl glycol or bis alkyl glycol borates in which the, or each, group $-OR^5]_p OR^6$ not derived from a monoalkyl ether of a monoglycol is derived from the monomethyl or monoethyl ether of di- or tri-ethylene glycol.

6. A hydraulic fluid according to claim 1 comprising borate ester in an amount of from 2 to 60% by weight.

* * * * *